INVENTORS
JOHN RAYMOND STAMPER
JOHN ALFRED SMITH

INVENTORS
JOHN RAYMOND STAMPER
JOHN ALFRED SMITH

United States Patent Office 3,548,514
Patented Dec. 22, 1970

3,548,514
HEATING APPARATUS EMPLOYING RADIANT AND CONVECTIVE HEAT MEANS USABLE AS A BAKE OVEN
John Alfred Smith, Maxey, near Peterborough, and John Raymond Stamper, Stamford, England, assignors to Baker Perkins Incorporated, Saginaw, Mich.
Filed May 27, 1968, Ser. No. 732,203
Claims priority, application Great Britain, May 30, 1967, 24,903/67
Int. Cl. F26b 21/02; A21b 1/06
U.S. Cl. 34—232          5 Claims

ABSTRACT OF THE DISCLOSURE

An oven chamber having a series of parallel heat radiating tubes for supplying heat to the chamber and gas circulation tubes for re-injecting recirculated chamber gas into the chamber between the radiating tubes which define nozzles therebetween to induce further gas circulation within the chamber.

---

This invention relates to heating apparatus, particularly ovens.

It is an object of the invention to provide novel heating apparatus of the type employing radiant heating means within a heating chamber and means for effecting agitation of the atmosphere within the chamber.

The invention consists in heating apparatus having a heating chamber, means for supporting goods to be heated within the chamber, radiant heating means within the chamber, injector means for passing hot pressurized gas into the chamber and hence through nozzle means in the chamber, the flow of hot injected gas through the nozzle means being adapted to induce a further flow of gas from within the chamber through the nozzle means, the gases on exit from the nozzle means being adapted to flow towards the goods supporting means, the heat radiating means being positioned in the flow of gas between the injector means and the goods supporting means.

In one form of the invention as set out in the preceding paragraph, the hot gas injected into the heating chamber is obtained from gas recirculated from the heating chamber in a closed circuit gas recirculation system. In a preferred form of the invention the heat radiating means itself has walls forming the nozzle means.

Figure 1:
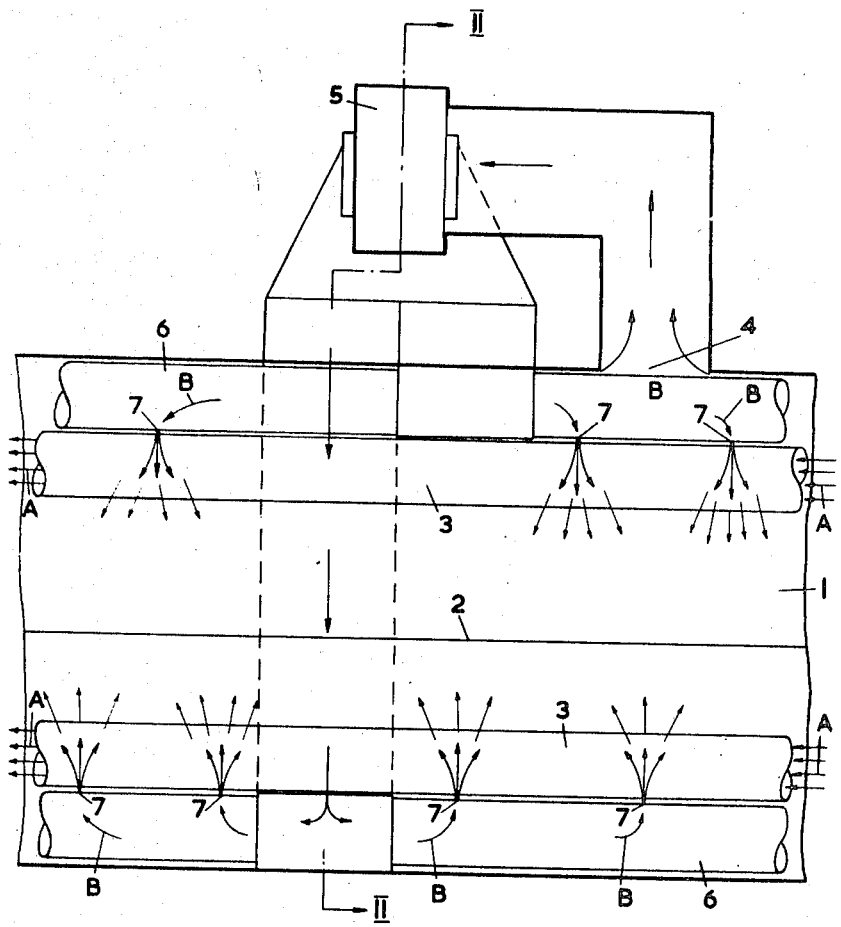
Figure 2:
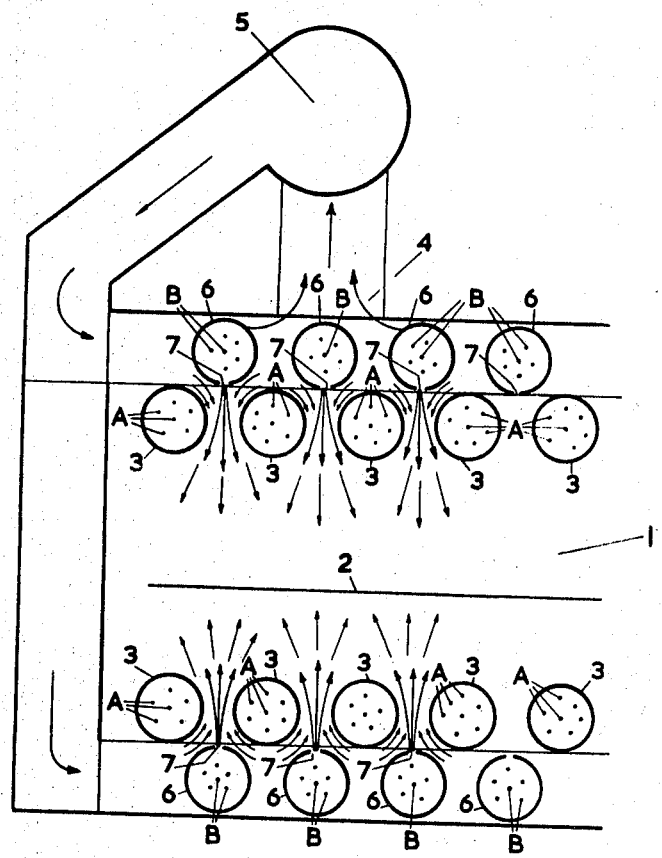
Figure 3:
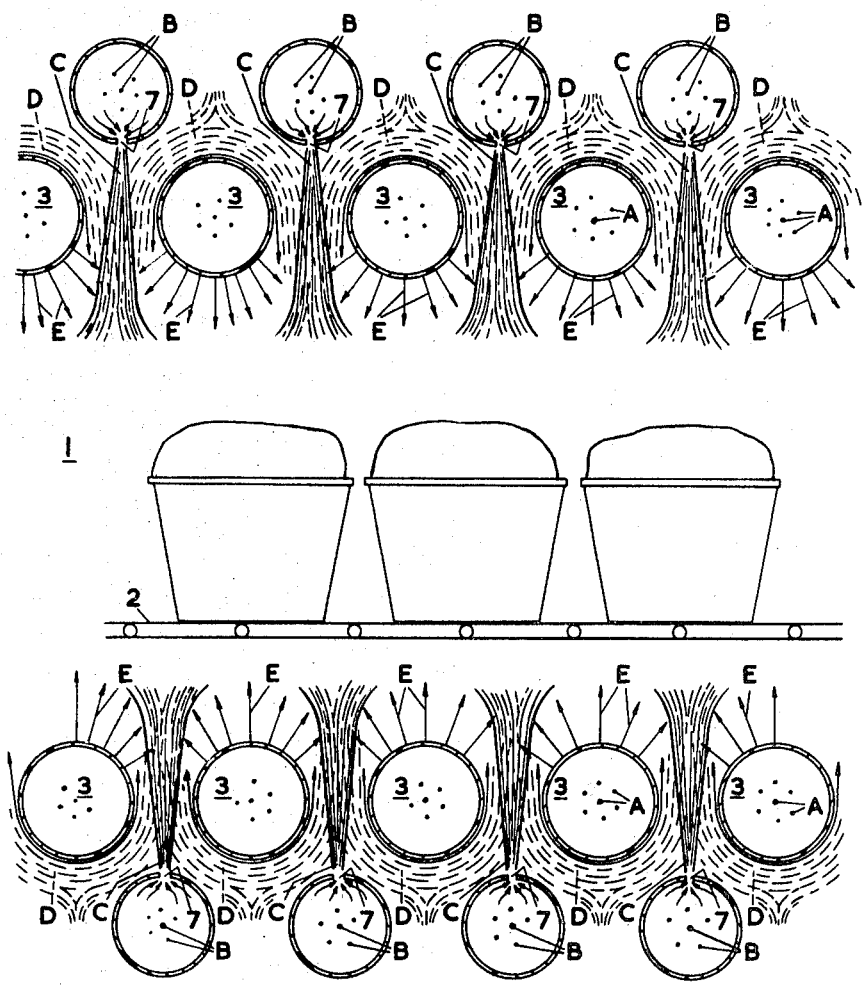

The invention will now be described by way of example with reference to the accompanying drawings in which FIG. 1 is a longitudinal sectional view through a part of an oven chamber, FIG. 2 is a section on line II—II of FIG. 1, and FIG. 3 is a view similar to FIG. 2 but on a larger scale and illlustrating more clearly the heating and gas flow effects obtained by the oven.

Referring to the drawings, a bakery tunnel oven has an elongate oven chamber 1 through which goods to be heated are passed on a moving conveyor band 2. Oven heat is obtained from a conventional type of closed circuit "cyclo therm" system comprising a plurality of circular section laterally spaced heat radiating tubes 3 extending longitudinally of the oven chamber above and below the conveyor band. Hot air indicated by arrows and dots A is continuously circulated through the tubes 3 in closed circuit, the air being heated by a non-illustrated burner or the like outside the heating chamber.

The oven chamber atmosphere is also agitated and recirculated in closed circuit by an air agitation system comprising an outlet 4 in the oven chamber through which oven gas is withdrawn by a fan 5 and returned to the oven chamber through a series of laterally spaced circulating tubes 6 extending longitudinally of the chamber parallel with the radiant heating tubes, each circulating tube being between a pair of radiant tubes and spaced further from the oven conveyor than the radiating tubes with a space therebetween. The flow of gas through the circulating tubes is illustrated by arrows and dots B. The circulating tubes have a longitudinal series of openings 7 directed towards the conveyor band, the openings forming injector inlets for the recirculated gas, which is thus directed in streams C towards the conveyor band between a pair of radiating tubes. The relative spacing between the radiating tubes and the recirculating tubes is such that the facing peripheries of a pair of radiating tubes 3 define a convergent-divergent nozzle so that a gas stream C flowing therethrough from a recirculation tube outlet causes a venturi effect and induces a further flow of gas from within the oven chamber through the nozzle and turbulent air agitation and substantially increased circulation of the oven atmosphere is thus achieved. The combined gas stream from each nozzle passes directly towards the oven conveyor. In this manner, the circulating oven gases are caused to flow over the radiating tubes and hence directly onto the goods. This is directed towards achieving a region of maximum temperature and turbulence around the oven conveyor which is useful, for example when baking bread loaves in strapped pans, for adequately baking the sides of the loaves. As shown in FIG. 3, gases D heated by the outer surfaces of the radiating tubes are induced to flow through the nozzle means by streams C and thereby mix with the streams C to increase their temperature and the inner surfaces of the radiating tubes still give off radiant heat directed towards the conveyor as shown by arrows E.

Control means may be provided for adjusting the amount of gas recirculation and numerous modifications are possible within the scope of the invention.

We claim:

1. Heating apparatus comprising: a heating chamber; means for supporting goods to be heated within the chamber; radiant heating means comprising a plurality of generally parallel, spaced radiating tubes in juxtaposition with said goods supporting means and adapted to pass heating medium therethrough, the peripheral walls of pairs of adjacent radiating tubes defining nozzle means; injection means for passing pressurized gas into the chamber through said nozzle means including a plurality of gas circulation tubes generally parallel with said radiating tubes and positioned, adjacent said radiating tubes to direct streams of gas through said nozzle means; and means mounting said gas circulation tubes outwardly of said radiating tubes relative to said goods supporting means.

2. Heating apparatus as set forth in claim 1 wherein said gas circulation tubes are interspersed between said radiating tubes.

3. Heating apparatus as set forth in claim 2 wherein said plurality of longitudinally extending radiating tubes include first and second groups of longitudinally extending tubes positioned on opposite sides of said goods supporting means; said plurality of longitudinally extending gas circulation tubes comprises third and fourth groups of longitudinally extending tubes interspersed with said first and second groups of tubes.

4. Heating apparatus comprising: a heating chamber; means for supporting goods to be heated within the chamber; radiant heating means comprising a plurality of generally parallel, spaced, radiating tubes in juxtaposition with said goods supporting means and adapted to pass heating medium therethrough, the peripheral walls of pairs of adjacent radiating tubes defining nozzle means; injection means for passing gas, under pressure, into the chamber through said nozzle means including a plurality of gas circulation tubes, each of said gas circulation tubes including gas discharge means positioned immediately adjacent said radiating tubes, for discharging gas between the tubes to create a venturi effect to induce a further flow of gas from within the chamber through said nozzle means.

5. Heating apparatus as set forth in claim 4 wherein said gas circulation tubes are spaced between pairs of radiating tubes so as to form pairs of substantially identical passages, between each gas circulation tube and the adjacent pair of radiating tubes, through which the induced gas will flow.

References Cited

UNITED STATES PATENTS 2,677,336   5/1951   Spooner _____ 107—55B

FOREIGN PATENTS 68,209   10/1957   France _____ 107—63X
294,439   4/1914   Germany _____ 107—63X LAVERNE D. GEIGER, Primary Examiner R. I. SMITH, Assistant Examiner U.S. Cl. X.R.

107—63